US010492612B2

(12) United States Patent
San Miguel et al.

(10) Patent No.: US 10,492,612 B2
(45) Date of Patent: Dec. 3, 2019

(54) FOAM SEAT ELEMENT, MOLD FOR THE PRODUCTION THEREOF AND METHOD TO MANUFACTURE THE MOLD

(71) Applicant: PROPRIETECT L.P., Toronto (CA)

(72) Inventors: Edgardo A. San Miguel, Leamington (CA); Robert B. Magee, Caledon East (CA); Leslie E. Clark, Cambridge (CA); David J. L. Miller, Bolton (CA); Larry A. Genyn, Mississauga (CA)

(73) Assignee: PROPRIETECT L.P. (CA)

( * ) Notice: Subject to any disclaimer, the term of this patent is extended or adjusted under 35 U.S.C. 154(b) by 0 days.

(21) Appl. No.: 14/469,813

(22) Filed: Aug. 27, 2014

(65) Prior Publication Data
US 2014/0368020 A1     Dec. 18, 2014

Related U.S. Application Data

(63) Continuation of application No. 13/487,676, filed on Jun. 4, 2012, now Pat. No. 8,821,777, which is a
(Continued)

(51) Int. Cl.
*A47C 7/18*     (2006.01)
*B29C 33/42*     (2006.01)
(Continued)

(52) U.S. Cl.
CPC .............. *A47C 7/18* (2013.01); *A47C 27/146* (2013.01); *B29C 33/424* (2013.01); *B60N 2/70* (2013.01); *B60N 2/7017* (2013.01)

(58) Field of Classification Search
CPC .......... A47C 7/18; A47C 27/14; A47C 27/142
See application file for complete search history.

(56) References Cited

U.S. PATENT DOCUMENTS 3,135,974 A * 6/1964 Roman ................ A47C 27/146
                                           5/725
3,161,436 A    12/1964 Hood
(Continued)

FOREIGN PATENT DOCUMENTS

CA         1060125 A       8/1979
CA         1139024 A       1/1983
(Continued)

OTHER PUBLICATIONS

First Office Action for People's Republic of China Patent Application No. 200680010727.1.
(Continued)

*Primary Examiner* — Philip F Gabler
(74) *Attorney, Agent, or Firm* — Katten Muchin Rosenman LLP

(57) ABSTRACT

There is disclosed an improved seat element having a seating surface element that incorporates a plurality of peak portions and a plurality of valley portions. Preferably, the plurality of peak portions and the plurality of valley portions is incorporated in an outermost surface of the seating surface element. The term "outermost surface" is intended to include an area of the seating surface element for contact by and/or support of an occupant of the seat element and does not include, for example, grooves or trenches in which there is disposed a component for attachment of a trim cover. A process and a mold for production of such a seat element are also described.

26 Claims, 15 Drawing Sheets

Related U.S. Application Data continuation of application No. 11/910,423, filed on Oct. 24, 2008, now abandoned.

(51) Int. Cl.
  *B60N 2/70* (2006.01)
  *A47C 27/14* (2006.01)

(56) References Cited

U.S. PATENT DOCUMENTS

| | | | | |
|---|---|---|---|---|
| 3,612,607 | A | * | 10/1971 | Lohr ........................ A47C 7/18 297/451.11 |
| 3,758,617 | A | | 9/1973 | Schmwerling |
| 3,824,199 | A | * | 7/1974 | Nadeau ..................... C08J 9/34 264/DIG. 14 |
| 4,070,719 | A | | 1/1978 | Morgan |
| 4,403,356 | A | | 9/1983 | Urai |
| 4,860,415 | A | | 8/1989 | Witzke |
| 4,862,538 | A | | 9/1989 | Spann et al. |
| 5,079,790 | A | * | 1/1992 | Pouch .................... A47C 7/021 5/630 |
| 5,105,491 | A | | 4/1992 | Yoshiyuki et al. |
| 5,294,181 | A | * | 3/1994 | Rose ...................... A47C 7/021 297/452.25 |
| 6,481,801 | B1 | | 11/2002 | Schmale |
| 6,759,444 | B2 | | 7/2004 | Brandoli et al. |
| 2002/0063465 | A1 | | 5/2002 | Pinkos |

FOREIGN PATENT DOCUMENTS

| | | |
|---|---|---|
| CA | 1202736 A | 4/1986 |
| JP | 2005-021263 A | 1/2005 |
| JP | 2005021263 A | 1/2005 |
| WO | 9419993 A1 | 9/1994 |

OTHER PUBLICATIONS

Office Action for Mexican Patent Application No. MX/a/2007/012115 dated Nov. 30, 2009.
International Search Report for International Application No. PCT/CA2006/000471 dated Aug. 2, 2006.
First Examination Report for for Indian Patent Application No. 7446/DELN/2007 dated Sep. 4, 2014.
Extended European Search Report for European Patent Application No. 06 721 732.3 dated Oct. 3, 2013.
Communication pursuant to Article 94(3) EPC for European Patent Application No. 06 721 732.3, dated Apr. 12, 2016.
Communication pursuant to Article 94(3) EPC for European Patent Application No. 06721732.3 dated Feb. 25, 2019.

\* cited by examiner

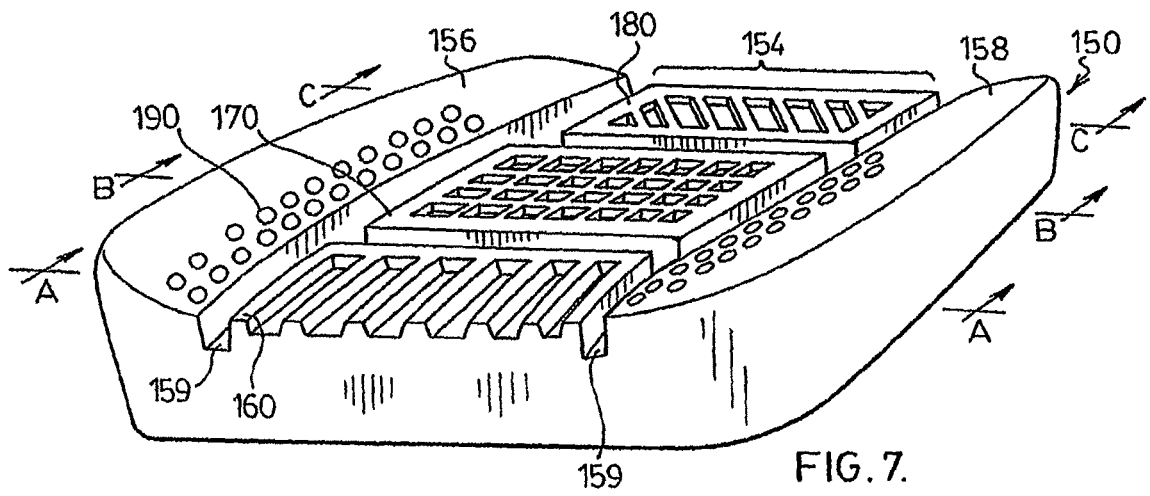
FIG. 7.
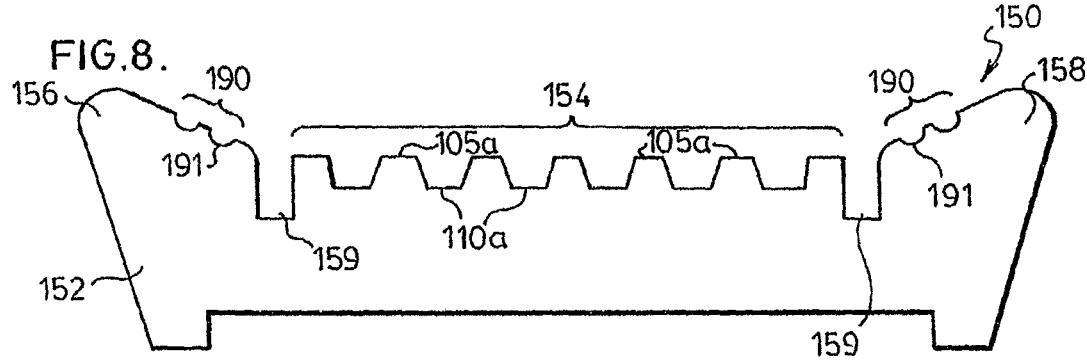
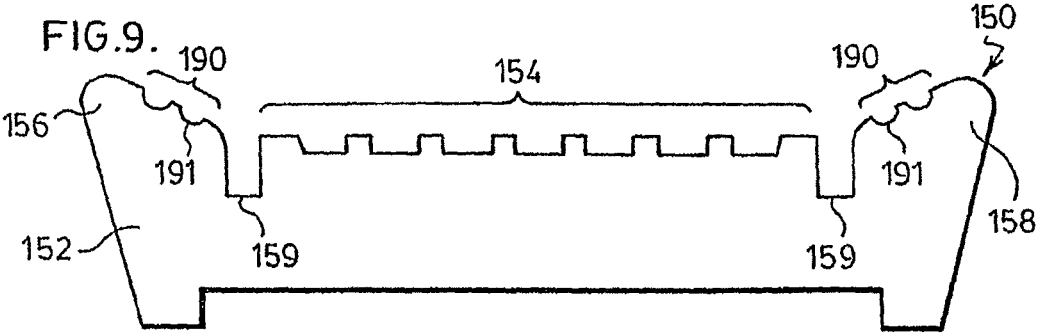
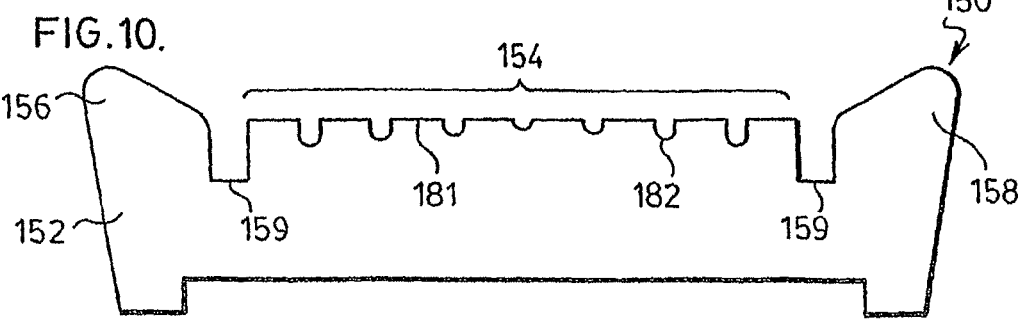

FOAM SEAT ELEMENT, MOLD FOR THE PRODUCTION THEREOF AND METHOD TO MANUFACTURE THE MOLD

This application is a continuation of U.S. patent application Ser. No. 13/487,676, filed Jun. 4, 2012 (now U.S. Pat. No. 8,821,777, issued Sep. 2, 2014), which is a continuation of U.S. patent application Ser. No. 11/910,423, filed Oct. 24, 2008 (abandoned), which is a 371 of International Patent Appln. No. PCT/CA2006/000471, filed Mar. 30, 2006, which is a non-provisional of U.S. Patent Appln. No. 60/666,195, filed Mar. 30, 2005, the contents of which are incorporated herein by reference.

FIELD OF THE INVENTION

In one of its aspects, the present invention relates to a foam seat element, preferably a foam vehicular seat element. In another of its aspects, the present invention relates to a process for producing a foam seat element, preferably a vehicular seat element. In yet another of its aspects, the present invention relates to a mold for producing a molded element, preferably a molded foam seat element, more preferably a molded foam vehicular seat element. In yet another of its aspects, the present invention relates to a method for producing a mold.

DESCRIPTION OF THE PRIOR ART

Passenger seats in vehicles, such as automobiles, are typically fabricated from a foam (usually a polyurethane foam) material which is molded into the desired shape and covered with an appropriate trim cover. The foamed material is selected to provide passenger comfort by providing a resilient seat and the trim cover is selected to provide the desired aesthetic properties.

In recent years, seats such as vehicular seats have been developed to confer one or more of the following to the seat: comfort, climate control, occupant detection and the like.

One area that has received particular attention is the provision of dual density or dual firmness seat components that are more dense or firmer in the peripheral portions of the seat thereby conferring to the occupant a snug or "wrapped-in" feel. This is especially important in performance vehicles which are designed such that turning at relatively high speed may be accomplished. However, there is an ongoing challenge to balance support provided by the seat with comfort of the occupant.

Dual density or dual firmness seat elements are expensive to produce and, in many cases, alter the feel of the supporting surface of the seat only in areas where it is perceived to be important to have different firmness properties. In other words, the conventional dual density or dual firmness seat elements use a generally coarse approach to provision of variable density or firmness.

Further, dual (or multi) density or dual (or multi) firmness seats typically require the use of two or more types of foam (e.g., molded, free rise, bead and the like) which are typically produced separately and secured together increasing the production time and costs of the final seat product. Alternatively, certain dual (or multi) firmness seats are made by molding or otherwise securing an insert (e.g., wire components, flexolators and the like) to a foam substrate.

Accordingly, it would be highly desirable to have the seat element that could be produced from a unitary foam element yet confer the benefits of dual density or dual firmness seats.

It would be further advantageous if such an approach were capable of being carried out using a much more finally tuned approach resulting in a seat element having a support surface that is designed for optimum comfort regardless of the size of a particular occupant.

It would be particularly advantageous if such an improvement could be implemented without the requirement for large capital expenditure.

SUMMARY OF THE INVENTION

It is an object of the present invention to obviate or mitigate at least one of the above-mentioned disadvantages of the prior art.

Accordingly, in one of its aspects, the present invention provides a seat element comprising a foam substrate and a seating surface element, at least a portion of the seating surface element comprising a plurality of peak portions and a plurality of valley portions.

In another of its aspects, the present invention provides mold for production of a seat element, the mold comprising a first mold portion and a second mold portion engageable to define a mold cavity, the first mold portion having a seating surface molding element comprising a plurality of peak portions and a plurality of valley portions.

In yet another its aspects, the present invention provides a method for manufacturing a mold for production of a seat element, the mold comprising a first mold portion and a second mold portion engageable to define a mold cavity, the first mold portion having a first molding surface comprising a seating surface molding element, the seat surface molding element comprising a plurality of peak portions and a plurality of valley portions, the method comprising the steps of:

forming an insert having a negative of the seating surface molding element;

placing the insert in a first temporary mold portion such that the combination of the insert and the first temporary mold portion corresponds substantially to the first molding surface of the first mold portion;

forming a second temporary mold portion having a negative of the first temporary mold portion;

disposing a casting composition on the second temporary mold portion;

forming a third temporary mold portion on an exposed portion of the casting composition, the second temporary mold portion and the third temporary mold portion combining to define a temporary mold having a mold cavity occupied by the casting composition;

removing the casting composition from the temporary mold;

dispensing a mold material in the mold cavity; and removing the second temporary mold portion and the third temporary mold portion to produce the first mold portion.

Thus, the present inventors have discovered an improved seat element having a seating surface element that incorporates a plurality of peak portions and a plurality of valley portions. Preferably, the plurality of peak portions and the plurality of valley portions is incorporated in an outermost surface of the seating surface element. The term "outermost surface" is intended to include an area of the seating surface element for contact by and/or support of an occupant of the seat element and does not include, for example, grooves or trenches in which there is disposed a component for attachment of a trim cover.

In a more preferred embodiment, in a resting (i.e., unoccupied) state of the seat element, the ratio of the contact surface area (peaks only) of the seating surface element to the surface area of the seating surface element is less than 1.

In a further preferred embodiment, the present seat element comprises a molded foam seat element, more preferably a molded foam element comprising a unitary foam portion. An advantage of using such a molded foam element in the present seat element is the presence of a skin on the surface of the seating surface element. The presence of the skin is characterized by the foam having a greater density at the surface (e.g., 1 mm depth) as compared to the central or core region. Density can be determined using ASTM D-3574. While not wishing to be bound by any particular theory or mode of action, it is believed that the presence of such a skin (e.g., as distinct from the case where the peaks are simply glued to and/or the valleys are simply cut out of the seating surface element) confers a desirable combination of support and comfort to an occupant of the seat element.

The present seat element has a number of advantages, including one or more of the following:
- it is possible to achieve in a single density foam part the "dual firmness" (or multi-firmness) that is conventionally achieved using multiple density foam pieces in a seat element—the terms "dual firmness" and "multi-firmness" are used interchangeably through this specification as are the terms "dual density" and "multi-density";
- it is possible to convert conventional dual firmness split bolsters (blades and bolsters) to a dual firmness full bolster by applying a soft touch to the inboard bolster area;
- it is possible to use the present seat element to confer the soft touch feel as an alternative to conventional so-called plus padding;
- the present seat element has improved ventilation, optionally in combination with climate control seat technology;
- the present seat element is expected to have improved acoustical features.;
- the present seat element has improved comfort both in fixed and adjustable lumbar areas;
- the present seat element has improved comfort in thigh support areas;
- the present seat element can be used to improve trim cover effects leading to improved craftsmanship;
- the present seat element can be used to obviate or mitigate the use of foam inserts (e.g., border wire foam inserts, felt material and the like) conventionally used for bolster reinforcement;
- the present seat element can be used in so-called thin seating applications;
- the present seat element provides improved comfort for non-vehicular seating applications such as marine, motorcycle and office furniture applications;
- biological effects such as improved blood flow, reduced muscle fatigue, reduced shear stress and the like can accrue from use of the present seat element; and/or
- the present seat element can be used in energy management foam applications by providing two distinct layers of crush/impact zones rather than a single layer.

Of course, those of skill in the art will recognize other advantages accruing from the present seat element based on the present specification.

BRIEF DESCRIPTION OF THE DRAWINGS

Embodiments of the present invention will be described with reference to the accompanying drawings, wherein like reference numerals denote like parts, and in which:

FIG. 7 illustrates a perspective view of a third preferred embodiment of a seat element in accordance with the present invention;

FIG. 8 illustrates a sectional view through line A-A in FIG. 7;

FIG. 9 illustrates a sectional view through line B-B in FIG. 7;

FIG. 10 illustrates a sectional view through line C-C in FIG. 7;

DETAILED DESCRIPTION OF THE PREFERRED EMBODIMENTS

Accordingly, an aspect of the present invention relates to a seat element. Preferably, a seat element is comprised in a vehicular or passenger seat. As used throughout this specification, the term "seat" is intended to have its conventional meaning and includes one or both of a bottom or cushion (i.e., the portion of the seat on which the occupant sits) and a back or backrest (i.e., the portion of the seat which supports the back of the occupant). As is known in the automotive, airline and related industries, a "seat" includes both a cushion (or bottom) and a back (or backrest). Thus, the term "seat" includes a seat element such as a cushion (or bottom), a back (or backrest) or a unit construction comprising a cushion (or bottom) and a back (or backrest). It should also be mentioned that a seat element may be considered to be a cushion (or bottom), a back (or backrest), a headrest and/or an armrest.

While highly preferred embodiments of the present invention will be illustrated with reference to a vehicular seat element, in particular a seat cushion (or bottom), it will be appreciated that the present seat element can be used in non-vehicular applications such as domestic and office furniture, stadium seating, theatre seating and the like.

Figure 1:
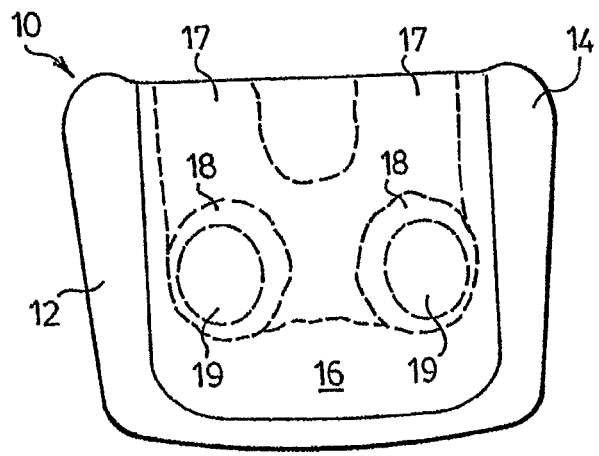
FIG. 1 illustrates a schematic top view of a vehicular seat bottom in which a portion of the seating surface has been pressure mapped to denote relative pressure points created by an occupant seated on the vehicular seat bottom.

With reference to FIG. 1, there is illustrated a schematic top view of a vehicular seat bottom in which a portion of the seating surface has been pressure mapped to denote relative pressure of an occupant seated on the vehicular seat bottom.

The pressure seat map illustrated in FIG. 1 can be generated in a conventional manner within the purview of a person of ordinary skill in the art. Once generated, the pressure map is useful insofar as it illustrates areas of relative pressure on the seating surface that are generated when occupant sits on that surface.

Thus, in FIG. 1, there is illustrated a seat bottom 10 having a pair of winged portions 12 and 14, and a seating surface 16. In the example shown in FIG. 1, the pressure map comprises three distinct pressure zones: a low pressure zone 17, a pair of intermediate pressure zones 18 and a pair of high pressure zones 19. It is to be understood that the terms "low pressure", "intermediate pressure" and "high pressure" are used in a relative sense and that within each zone there can be some variation in pressure. In a typical pressure map, such variation may be colour coded.

By assessing areas of pressure generated by a typical occupant in such a manner, it is possible to identify the locations on seating surface 16 (and possibly on winged portions 12,14) in which it is desirable to manage surface response to the forces generated by a seated occupant.

Figure 2:
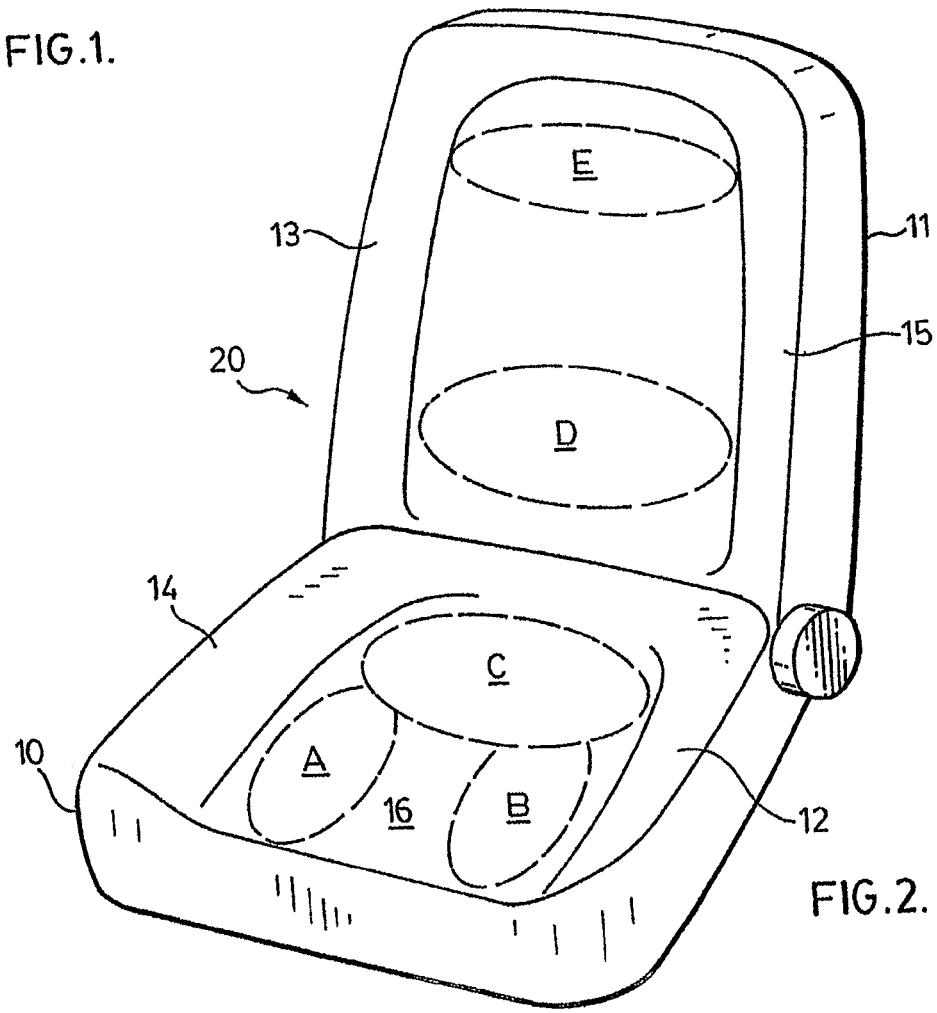
FIG. 2 illustrates a schematic view of an embodiment of pressure mapping a vehicular seat unit.

With reference to FIG. 2, there is illustrated a perspective view of a vehicular seat 20 comprising seat bottom 10 described with reference to FIG. 1 and a seat back 11 connected thereto.

The following portions in vehicular seat 20 contain support surfaces in which it may be desirable to manage the response of the surface to pressure from a typical occupant seated in vehicular seat 20: A, B, C, D and E. The precise location and dimension of these portions of the surface can be determined using pressure mapping technique described above with reference to FIG. 1. As stated with reference to FIG. 1, in certain cases, it may be desirable to design a managed surface response in one or both winged portions 12 and 14 in seat bottom 10. Further, it may be desirable to design a managed surface response in shoulder support portions 13 and 15 in seat back 11.

Figure 3:
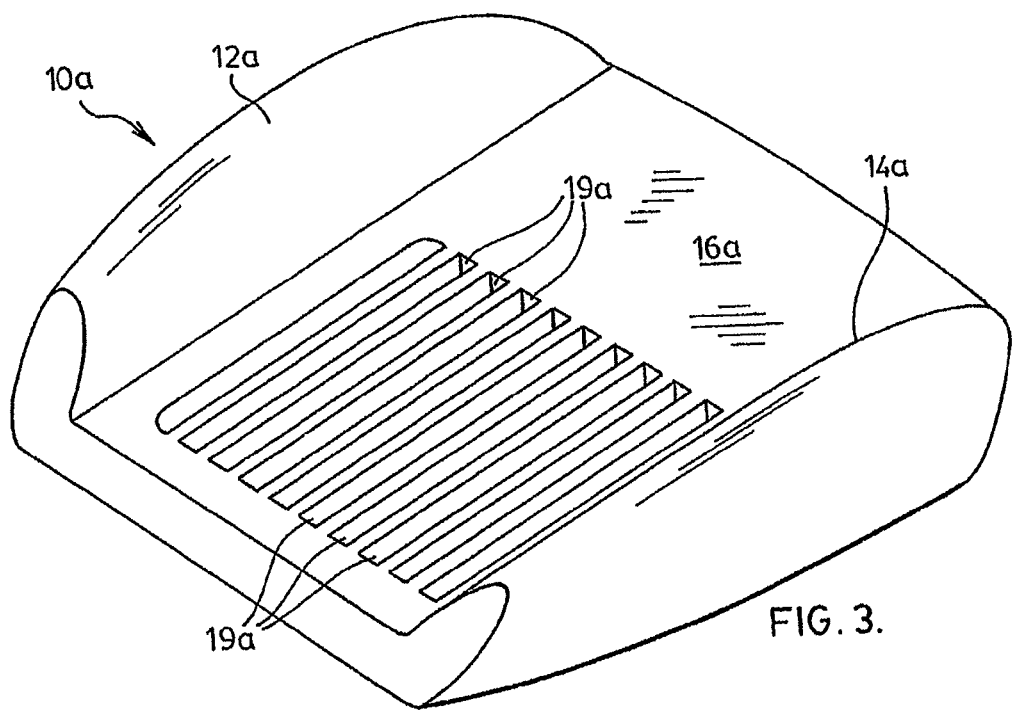
FIG. 3 illustrates a first preferred embodiment of a seat element in accordance with the present invention.
Figure 4:
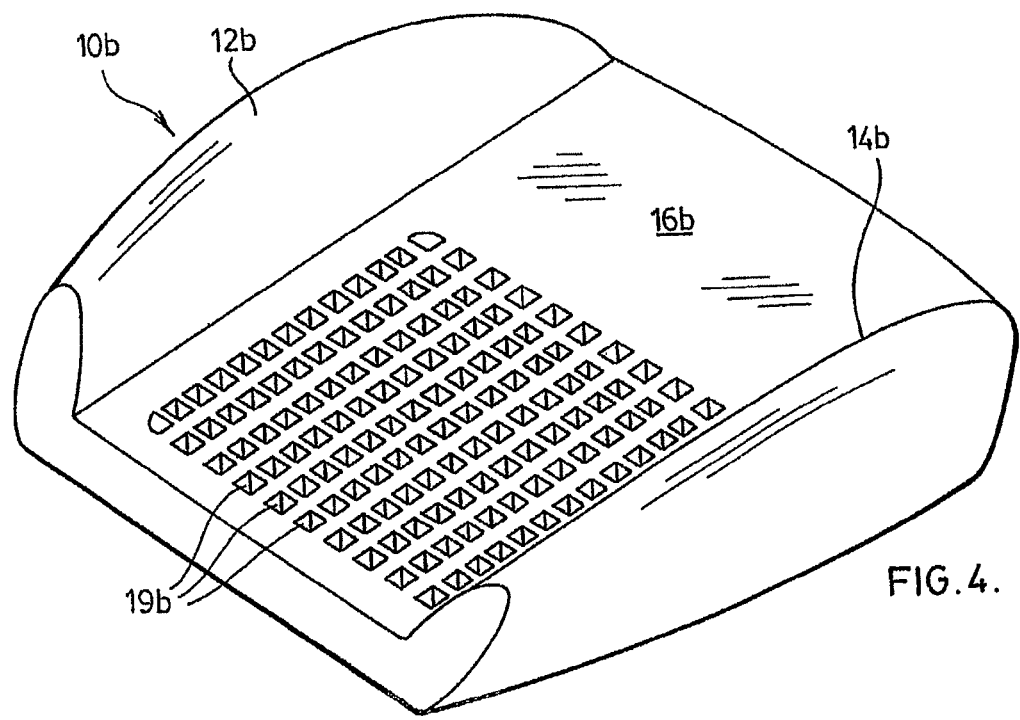
FIG. 4 illustrates a second preferred embodiment of a seat element in accordance with the present invention.

With reference to FIGS. 3 and 4, there are illustrated specific embodiments of a seat bottom. In FIGS. 3 and 4, similar reference numerals are used as in FIG. 1. In FIG. 3, the suffix "a" has been used to denote like elements with respective FIG. 1. In FIG. 4, the suffix "b" has been used to denote like elements with respective FIG. 1.

In FIG. 3, a series of grooves 19a is molded into seating surface 16a to provide a managed surface response to relatively high pressure imposed on that portion of seating surface 16a in response to an occupant seating on seat bottom 10a. As will be seen, this managed surface response corresponds generally to the location of intermediate pressure zones 18 and high pressure zones 19 generated from the pressure map shown in FIG. 1.

With reference to FIG. 4, it will be seen that seating surface 16b includes a plurality of recesses 19b which are arranged to provide a managed surface response to the portion of seating surface 16b that is expected to experience a relatively high force in response to an occupant sitting on seating surface 16b.

Figure 5A:
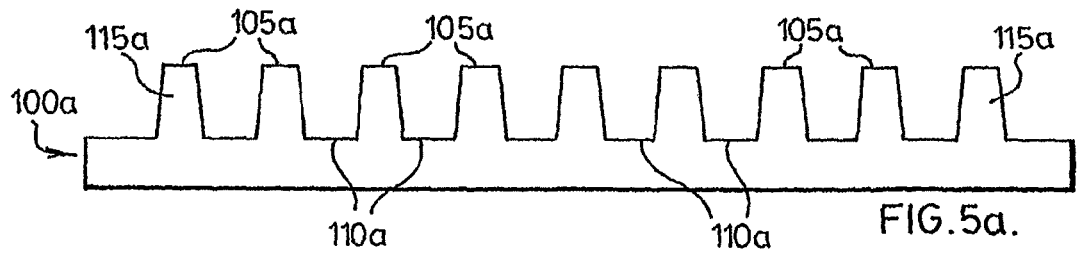
FIGS. 5a, 5b and 5c each illustrate an enlarged portion of seat element in accordance with the present invention.
Figure 5B:
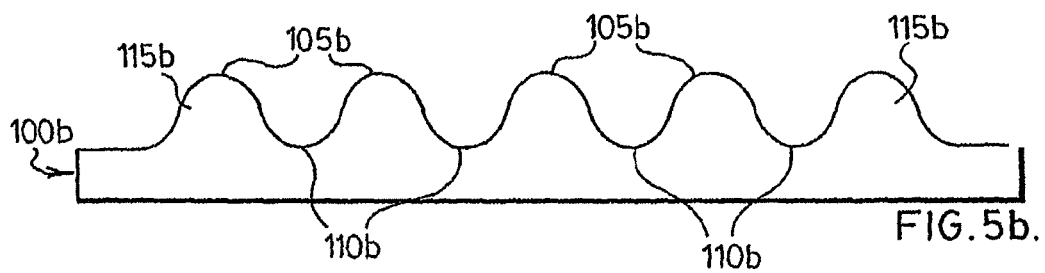
Figure 5C:
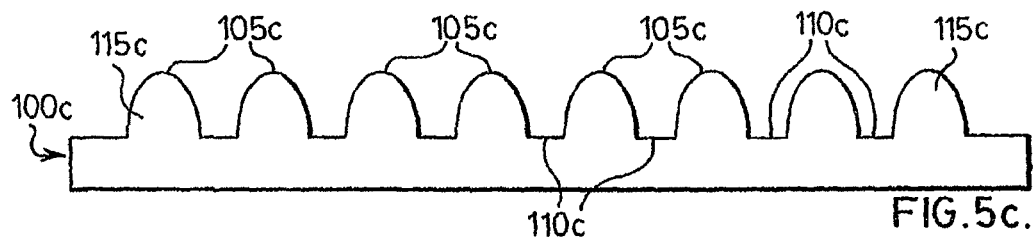

With reference to FIGS. 5a, 5b and 5c, there are illustrated cross-sectional views of various preferred embodiments of the portion of the seat element surface on which it is desired to implement a managed surface response. In other words, the remaining portion of the seat element has not been shown for clarity.

In FIG. 5a, there is illustrated a surface 100a comprising a series of peaks 105a and valleys 110a. As show, each peak 105a comprises a flat apex and each valley 110a comprises a flat floor (or nadir portion). Peaks 105a and valleys 110a combine to define a series of projections 115a that are generally in the shape of a trapezoid, more particularly, a bi-laterally symmetrical trapezoid.

In FIG. 5b, a suffix "b" has been added after each reference numeral to denote similar elements with respect to FIG. 5a. Thus, in FIG. 5b, it will be seen that peaks 105b have a round a pecks whereas valleys 110b have a rounded floor (or nadir portion). Further, peaks 105b and valleys 110b combine to define a series of projections 115 which, in cross-section, are generally bell-shaped.

In FIG. 5c, a suffix "c" has been added after each reference numeral to denote similar elements with respect to FIG. 5a. Thus, in FIG. 5c, it will be seen that peaks 105c have a rounded apex whereas valley 110c have a flat floor (or nadir portion). Further, it will be seen that peaks 105c and valleys 110c combine to form a series of projections 115c that, in cross-section, have a substantially parabolic shape.

As will be appreciated by those of skill in the art, the specific embodiments illustrated in FIGS. 5a, 5b and 5c are exemplary in nature. Those of skill in the art having in hand the present specification will be able to modify the specifically illustrated embodiments or design other embodiments that have peaks and valleys, and are otherwise useful in the present seat element.

With reference to FIGS. 6a, 6b, 6c and 6d, there is illustrated, in schematic form, a top view of a seat element in accordance with the present invention. In FIGS. 6a, 6b, 6c and 6d, a series of projections is shown as 115 (no suffix). Projections 115 can be of the form illustrated in FIGS. 5a, 5b and 5c or in any other shape projection that provides a desirable managed surface response.

Figure 6A:
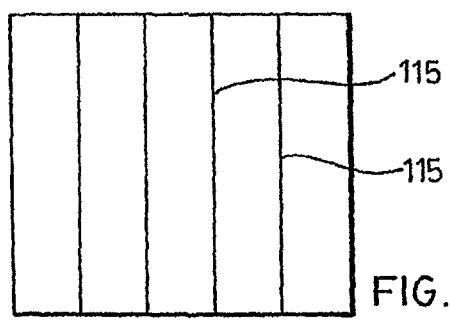
FIGS. 6a, 6b, 6c and 6d each illustrate various arrangements of the patterns illustrated in FIGS. 5a, 5b and 5c.
Figure 6C:
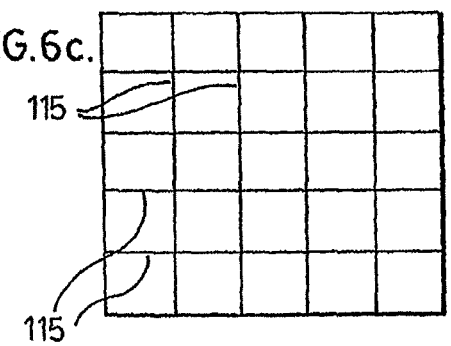
Figure 6B:
Figure 6D:
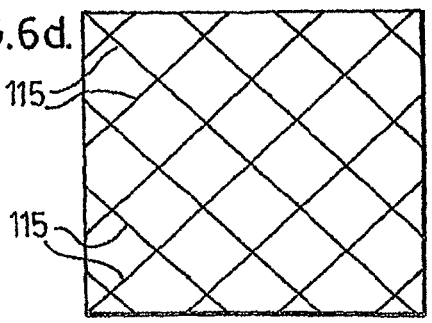

FIG. 6a illustrates projections 115 in a parallel row or radiator-type arrangement. FIG. 6b illustrates projections 115 in a diagonal arrangement. FIG. 6c illustrates projections 115 in a checkerboard-type arrangement and FIG. 6d illustrates projections 115 in a diamond-type pattern. Of course, those with skill in the art, having the present specification in hand, will be able to immediately reduce to practice many other arrangements of projections 115 using the cross-sections shown in FIGS. 5a, 5b and/or 5c, or other cross-sectional shapes.

With reference to FIGS. 7-10, there is illustrated a preferred seat bottom 150 having multiple sections that provide a managed surface response.

Generally, seat bottom 150 comprises a unitary foam element 152 that can be made from polyurethane foam, polypropylene foam, polyethylene foam and the like (polyurethane foam is the most preferred foam).

Seat bottom 150 comprises a primary seating surface 154. Primary seating surface 154 comprises a first textured surface 160, a second textured surface 170 and third textured surface 180.

Seat bottom 150 further comprises a pair of winged portions 156,158. Each winged portion 156,158 comprises a fourth textured surface 190.

First textured surface 160 comprises projections similar to projections 115a in FIG. 5a arranged in a pattern similar to the one illustrated in FIG. 6a.

Second textured surface 170 comprises a series of projections that have a substantial rectangular shape in a pattern such as the one illustrated in FIG. 6c.

Third textured surface 180 comprises a series of projections made up of peaks having a generally flat apex 181 and a series of valleys having a rounded floor 182 (or nadir portion) arranged in a pattern similar to that shown in FIG. 6b. It will be noted that the depth of valleys 182 increases from the middle of seating surface 154 to the periphery thereof.

Fourth textured surface 190 is disposed on each of winged portions 156,158 and runs along the length of first textured surface 160 and second textured surface 170. Forth textured surface 190 comprises two rows of cup-shaped portions having a rounded valley 191 (or nadir portion). Seat bottom 150 further comprises a series of grooves 159 which serves to isolate first textured surface 160, second textured surface 170, third textured surface 180 and fourth textured surface 190. In a preferred embodiment series of grooves 159 also serves to have disposed therein a suitable trim cover attachment system (e.g., hog-ring wires, touch fasteners such as Velcro™-type fasteners, mechanical clips and the like).

Figure 11A:
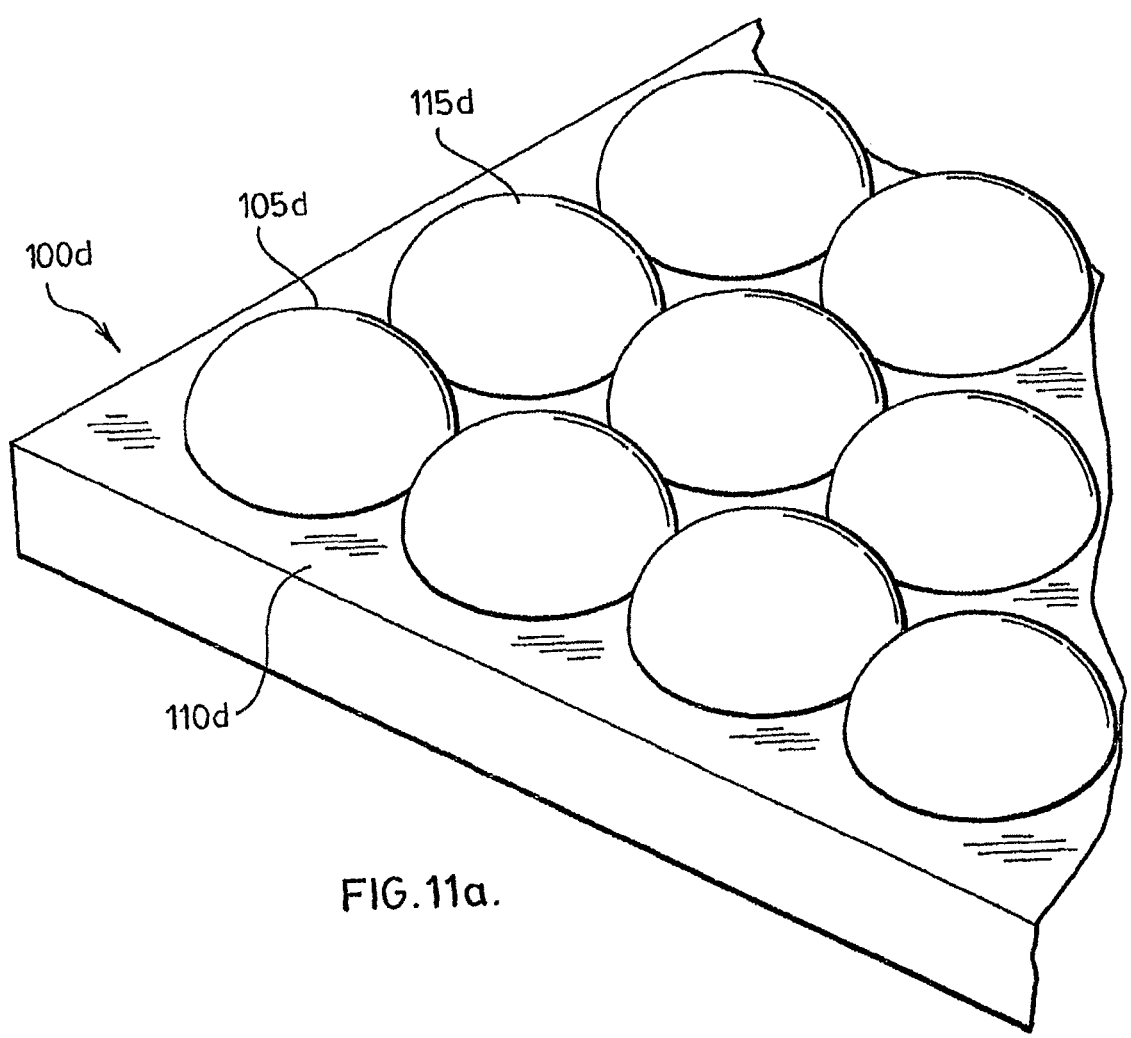
FIGS. 11a, 11b and 11c each illustrate a further embodiment of a textured surface repeating pattern that can be used in the present seat element.

FIG. 11a illustrates an enlarged perspective view of a textured surface 100d comprising a series of semi-spheroid shaped projections 115d. Projections 115d comprise rounded peaks 105d and a substantially continuous floor 110d which act as a "valley".

Figure 11B:
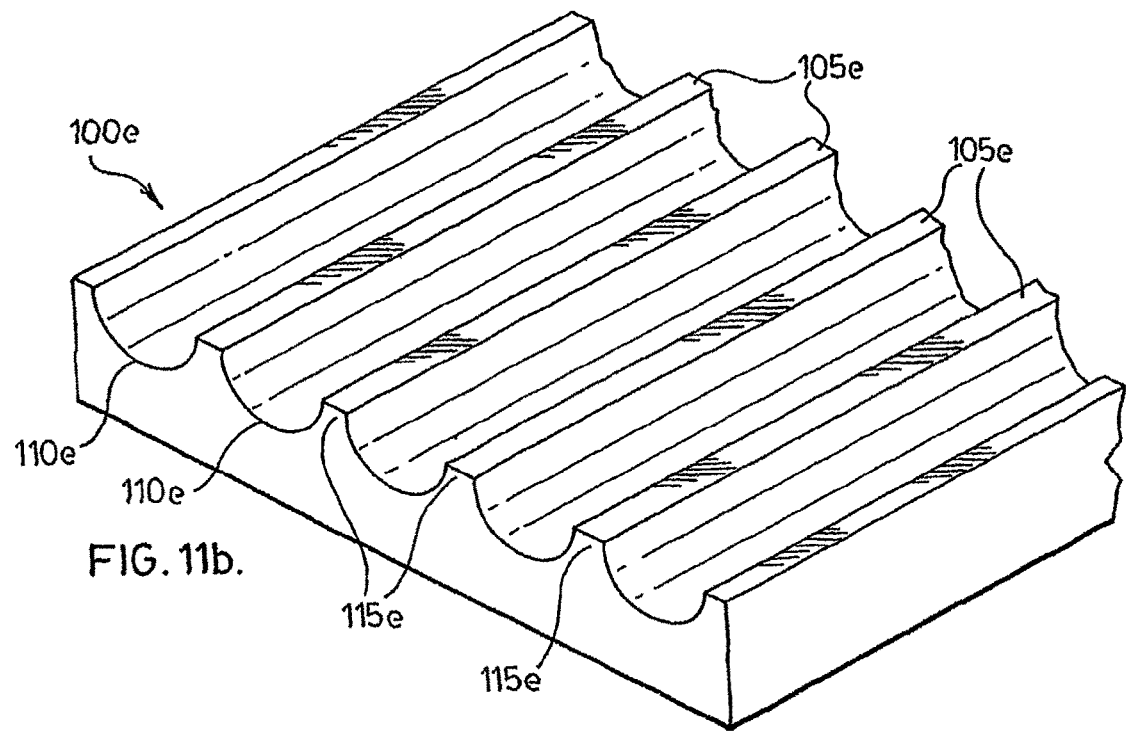

FIG. 11b illustrates an enlarged perspective view of a textured surface 100e comprising a series of elongate projections 115e. Projections 115d comprise elongate flat peaks 105e and a substantially elongate round floor 110e.

Figure 11C:
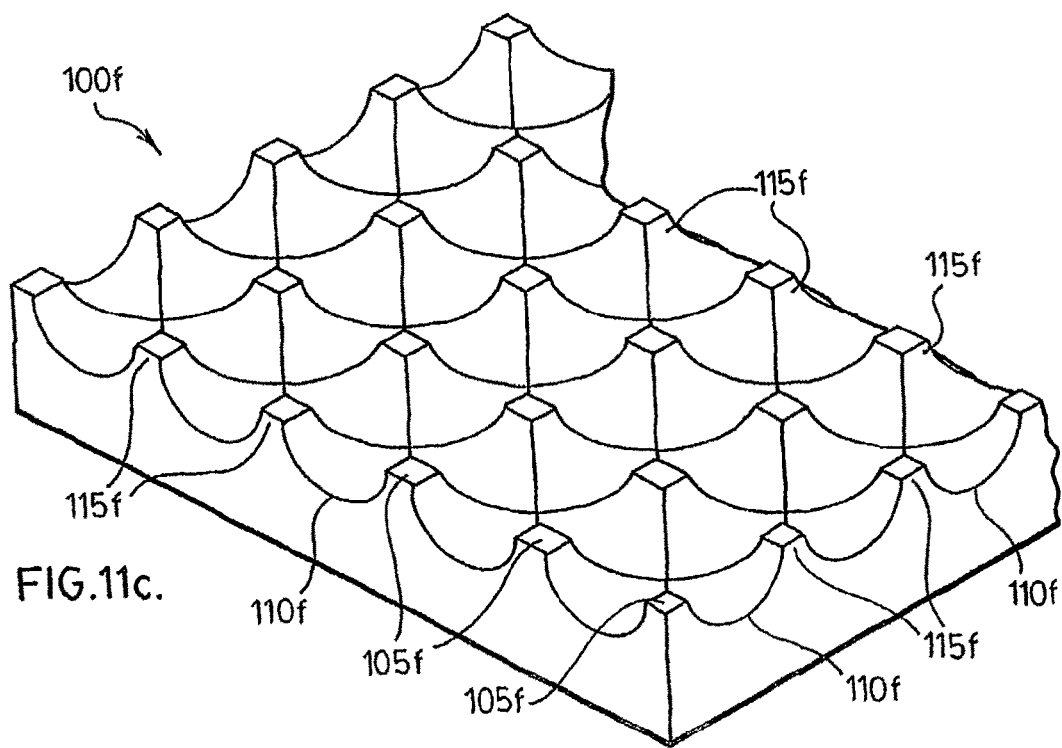

FIG. 11c illustrates an enlarged perspective view of a textured surface 100f comprising a series of projections 115f. Projections 115f comprise flat peaks 105e and a substantially ogival or rounded valley (or nadir portion) 110e.

With reference to FIGS. 12-32, there is illustrated a stepwise process to producing mold capable of forming a seat element having a textures surface such as shown in FIG. 3 described above.

Figure 12:
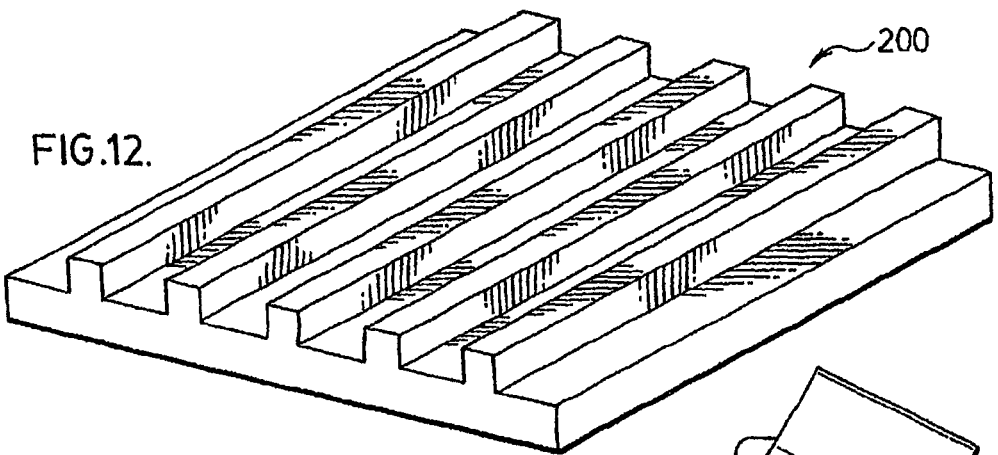
FIGS. 12-32 illustrate, in a step-wise manner, production of a first mold section to be used in the present mold.

With reference to FIG. 12, a machined master form 200 is produced in a conventional manner (typically from aluminum, wood or any other sufficiently durable material). Machined master form 200 has a negative of the desired texture surface to be conveyed to the seat element.

Figure 13:
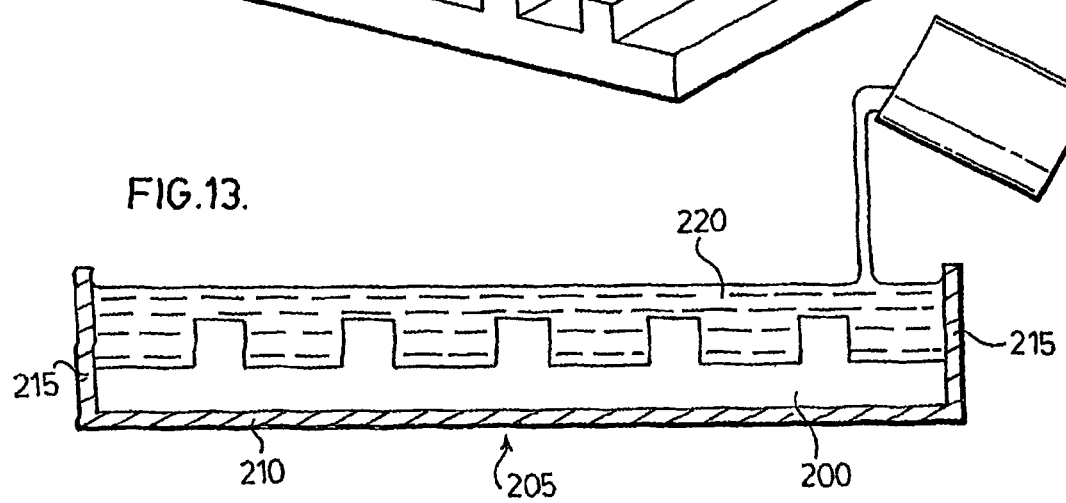

With reference to FIG. 13, machined master form 200 is disposed in a container 205 comprising a base 210 and a pair of side walls 215. A resin (e.g., urethane, silicone and the like) composition 220 is dispensed atop machined master form 200 in a conventional manner.

Figure 14:
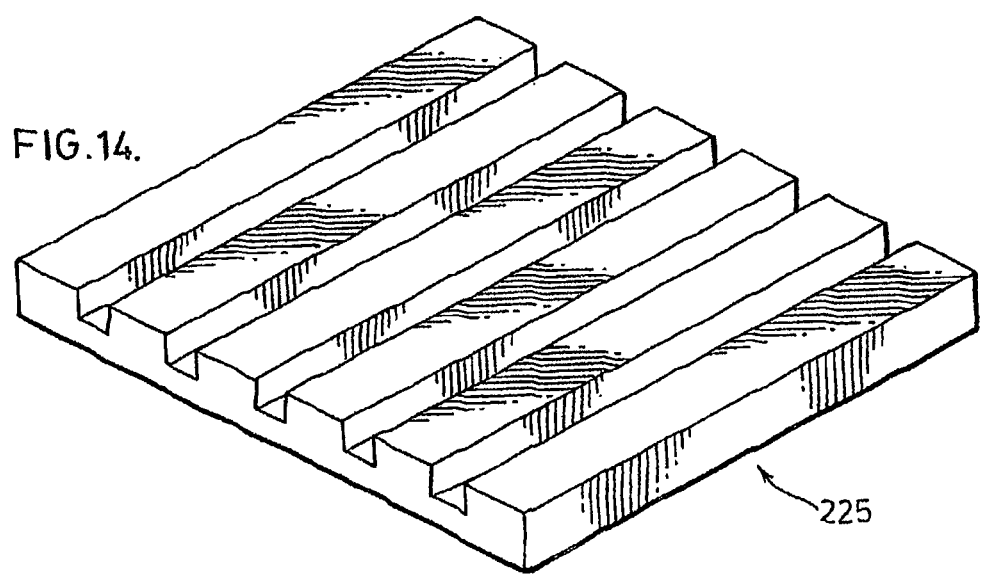
Figure 15:
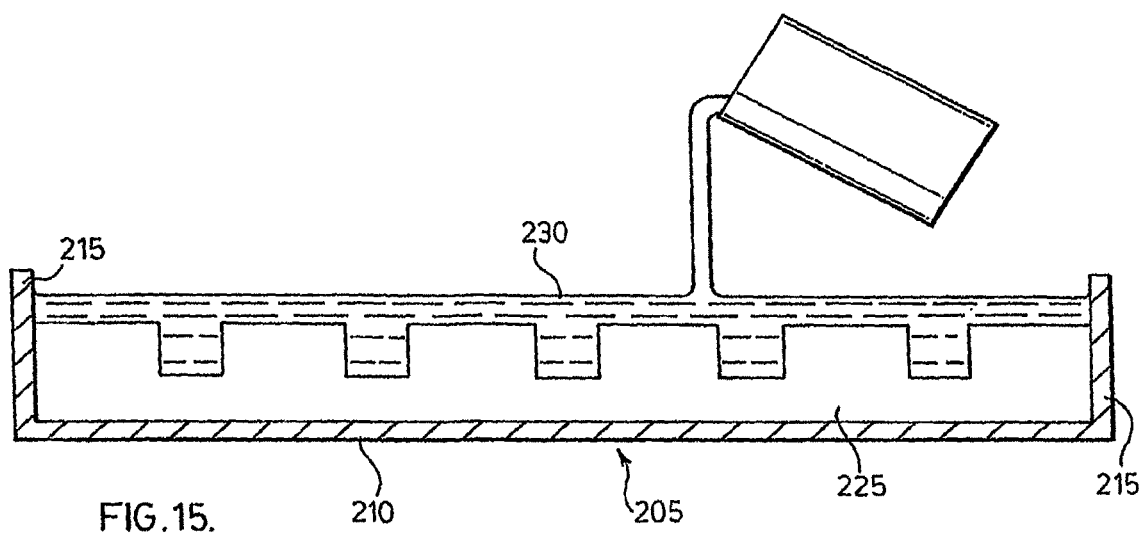
Figure 16:
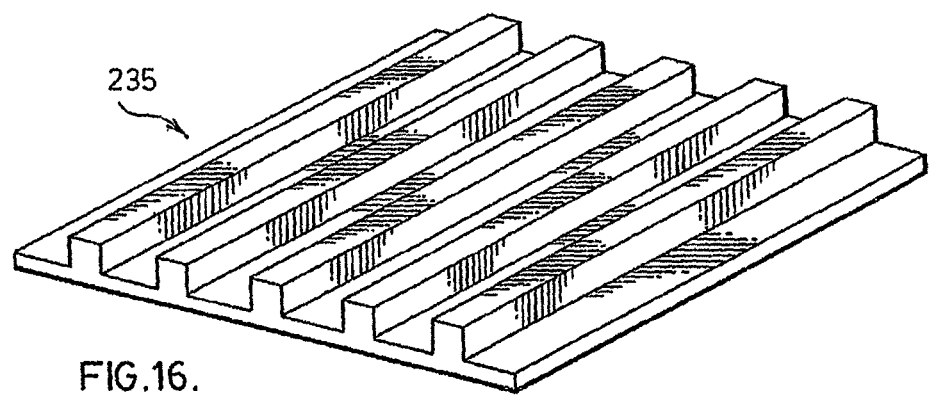

After epoxy resin 220 has cured, it is removed from machined master form 200 to yield a cast resin form 225 having the textured surface to be conveyed to the product eventually to be molded—see FIG. 14.

Cast resin form 225 is placed in container 225 (or another container). A urethane-forming mixture 230 is dispensed atop as resin form 225 in a conventional manner. Urethane forming mixture 230 is allowed to cure and is thereafter removed from container 200 to yield urethane mat 235 which has the same textured surface as machined master form 200—see FIG. 16.

Figure 17:
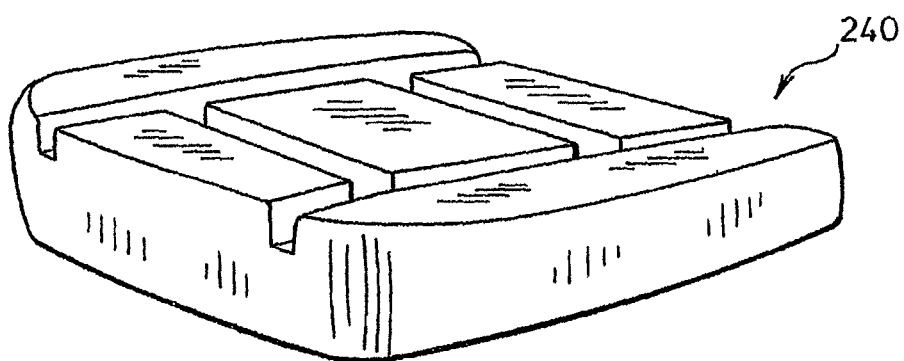

With reference to FIG. 17, a model 240 of the finished seat element is constructed without the textured surface. Model 240 may be constructed from wood or any other material that is sufficiently durable to withstand the mold manufacturing process.

Figure 18:
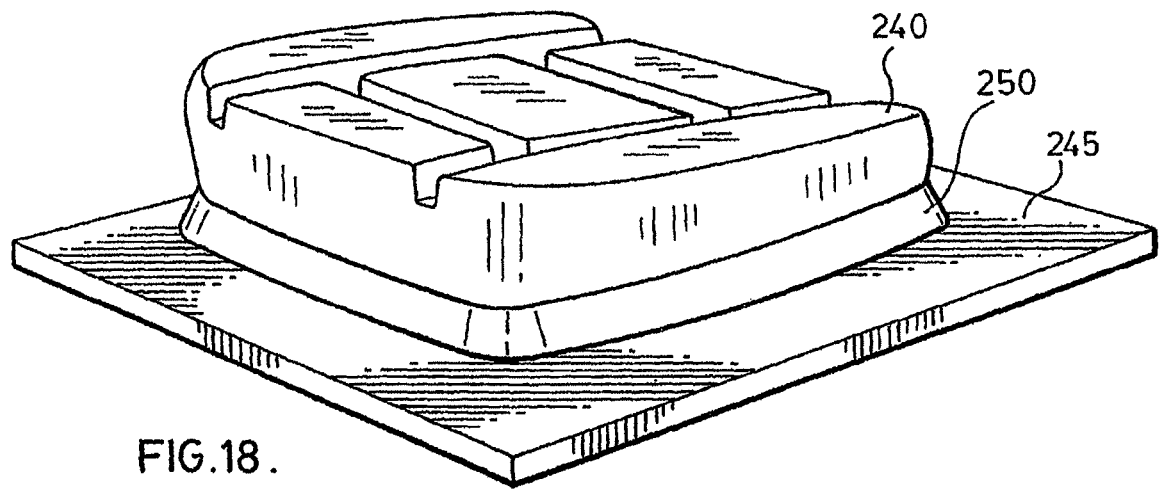

With reference to FIG. 18, model 240 is mounted on a follow board 245 having a seal block area 250.

Figure 19:
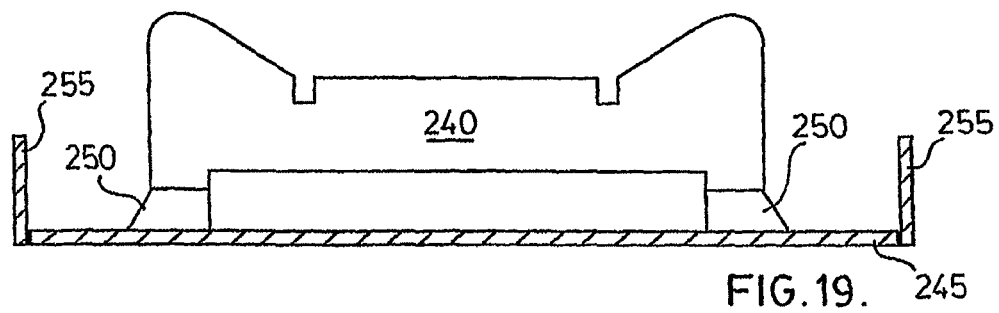

With reference to FIG. 19, model 240 mounted on follow board 245 is than placed in a containment box 255.

Figure 20:
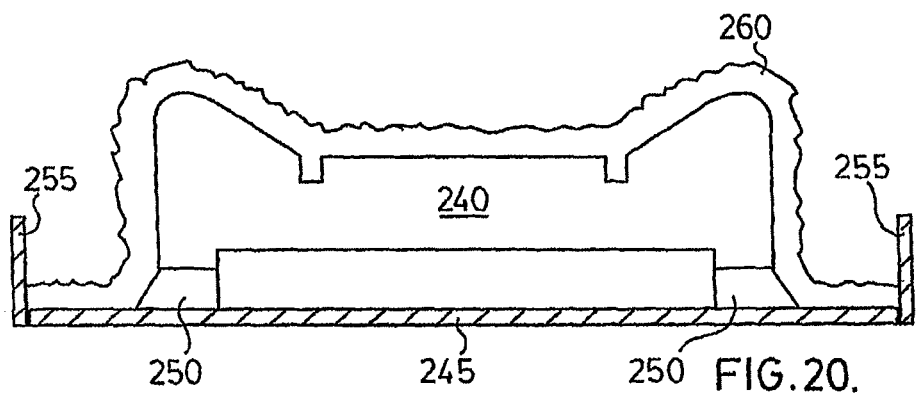
Figure 21:
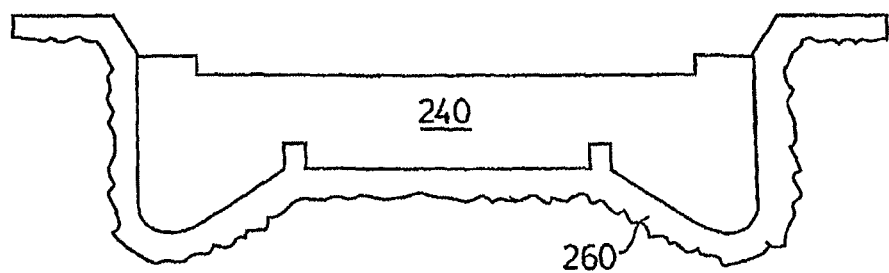

Next, with reference to FIG. 20, the exposed surfaces of model 240, follow board 245, seal block 250 and a portion of containment box 255 are covered with a layer of plaster (or other curable) material 260. Once plaster material 260 has cured (or otherwise requires sufficient integrity to be handled), follow board 245, seal block 250 and containment box 255 are removed while leaving model 240 with plaster composition 260—see FIG. 21.

Figure 22:
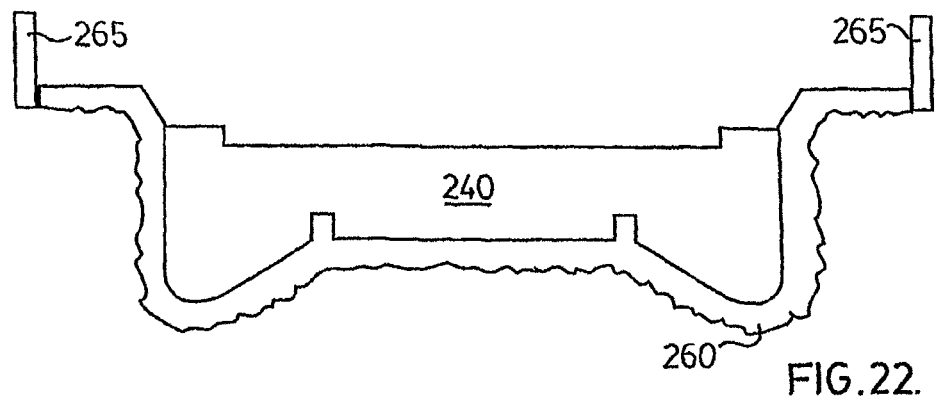

With reference to FIG. 22, a lid containment box 265 is placed around the marginal edges of plaster composition 260.

Figure 23:
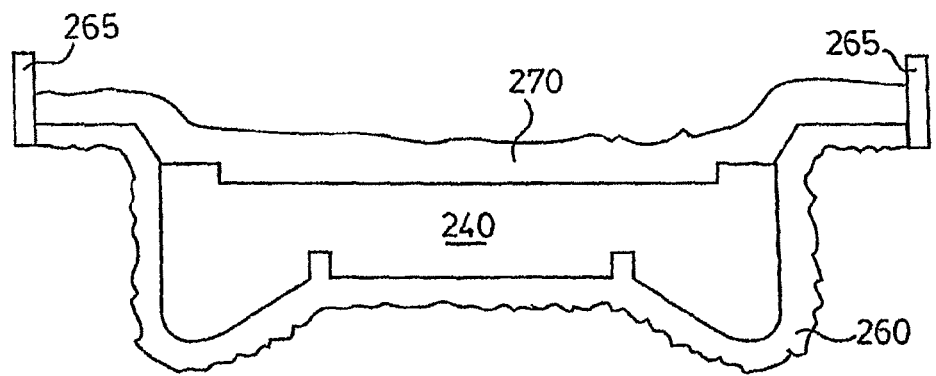

Next, plaster (or other curable) composition 270 is dispensed on exposed portions of model 240, plaster composition 260 and a portion of lid containment box 265—see FIG. 23. Once plaster composition 270 has been cured (or otherwise acquires sufficient integrity), the bowl pattern formed by plaster composition 260 is separated from the lid pattern form by plaster composition 270 and model 240 is removed.

Figure 24:
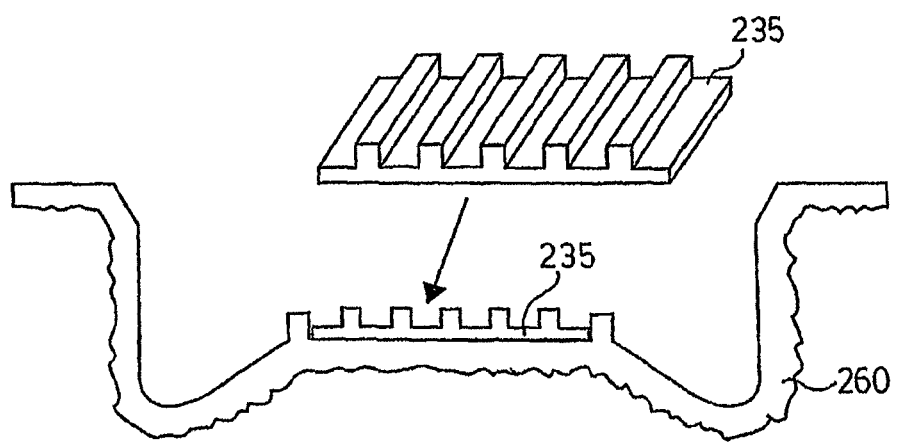

With reference to FIG. 24, mat 235 (FIG. 16) is disposed as illustrated in the bowl pattern formed by plaster composition 260.

Figure 25:
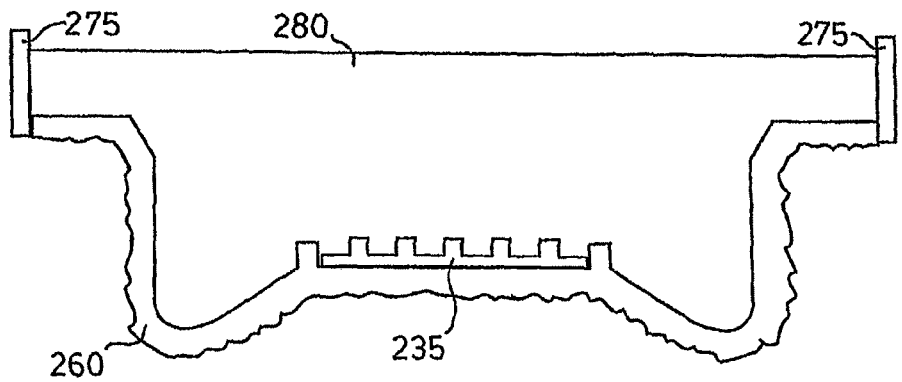

Thereafter, a foundry containment box 275 is disposed around the marginal edges of the bowl formed by plaster composition 260—see FIG. 25.

Next, a sand-based (or plaster-based) foundry composition 280 is dispensed in the bowl formed by plaster composition 260 and is contained within foundry containment box 275.

Figure 26:
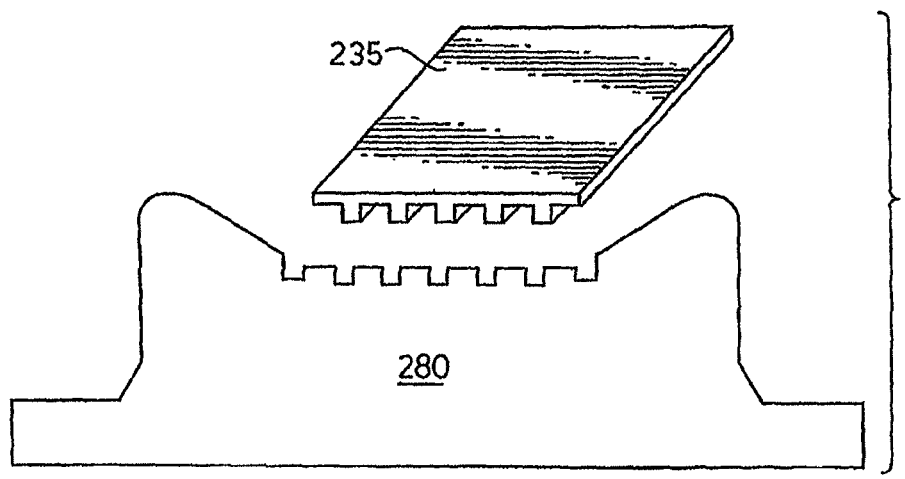

With reference to FIG. 26, once the sand-based foundry composition has cured, it is separated from the bowl formed by plaster composition 260 and foundry containment box 275, and mat 235 is removed therefrom.

Figure 27:
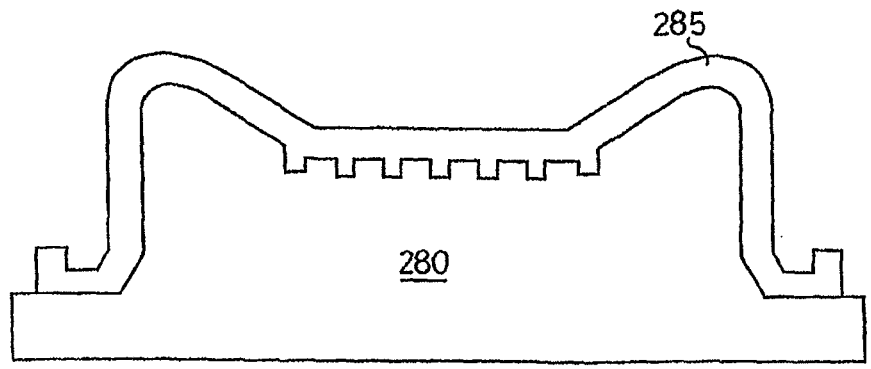

With reference to FIG. 27, a clay (or other malleable) composition 285 is applied over the surface of sand-based foundry composition 280 at a thickness equivalent to the desired thickness of the mold to be manufactured.

Figure 28:
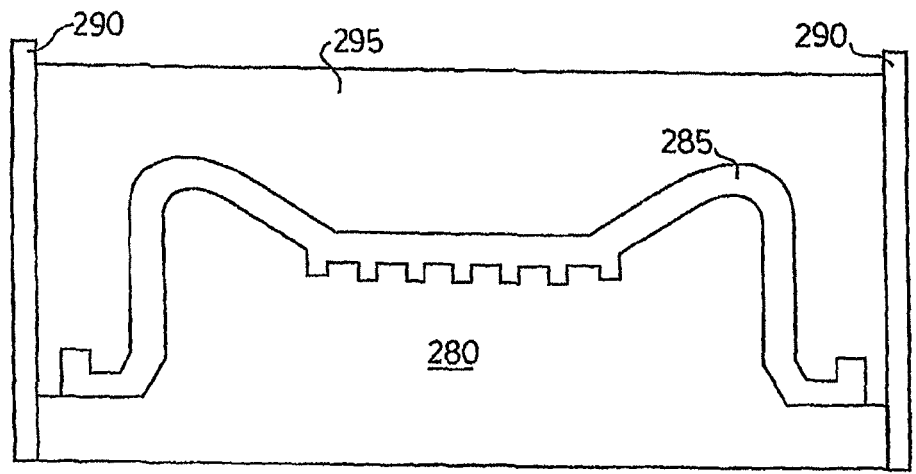
Figure 29:
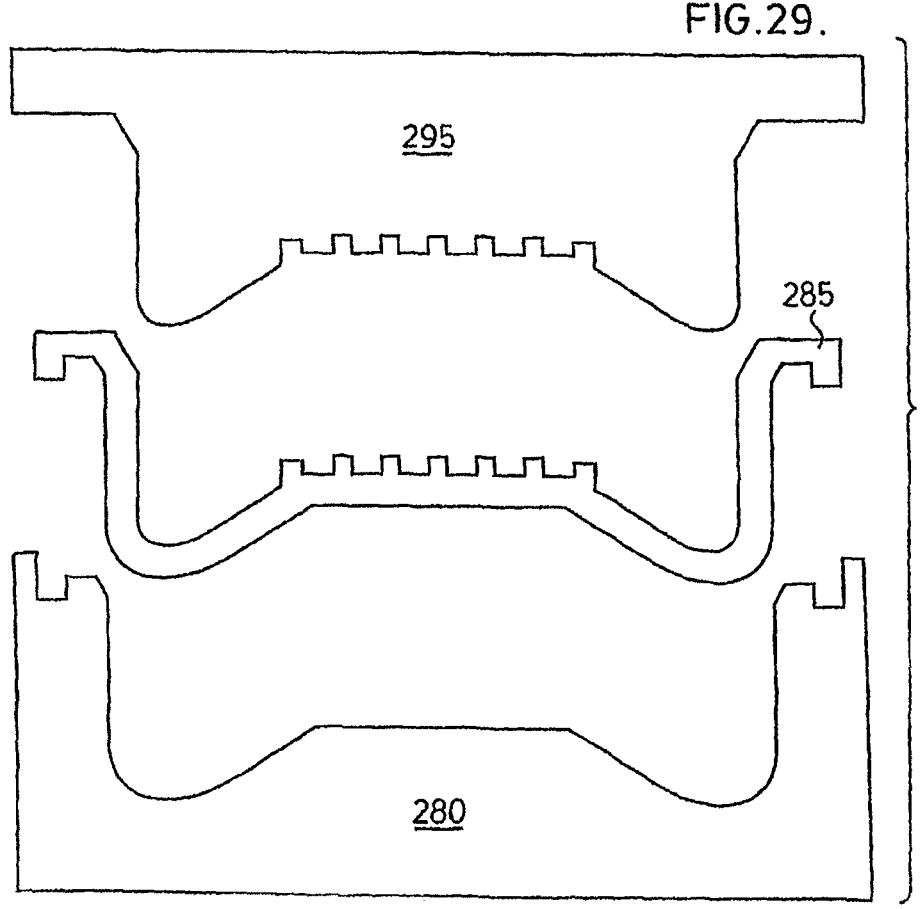

Next, a foundry containment box 290 is placed around sand-based foundry composition 280 and further sand-based foundry composition 295 is placed atop the exposed portions of clay composition 285, sand-based foundry composition 280 and exposed portions of foundry composition 290—see FIG. 28. With reference to FIG. 29, once sand-based foundry composition 295 has cured, it is separated from foundry containment box 290, clay composition 285 and sand-based foundry composition 280.

Figure 30:
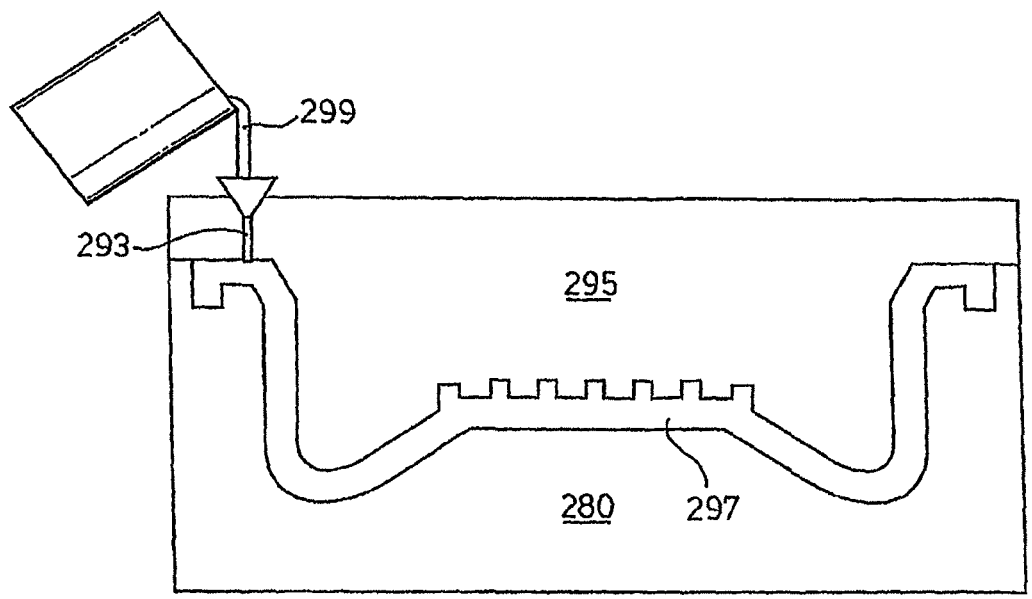
Figure 31:
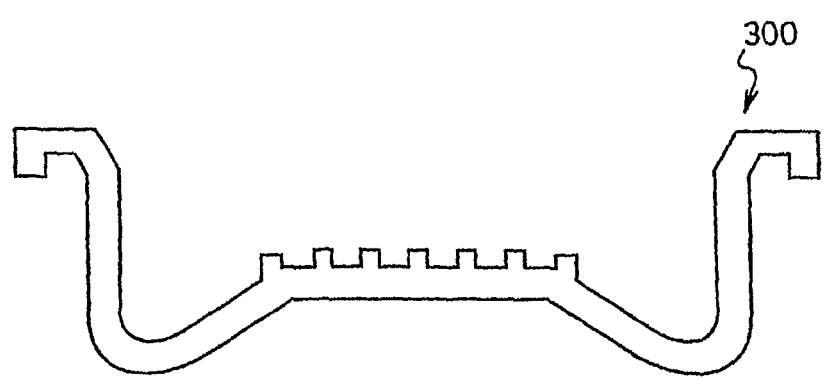
Figure 32:
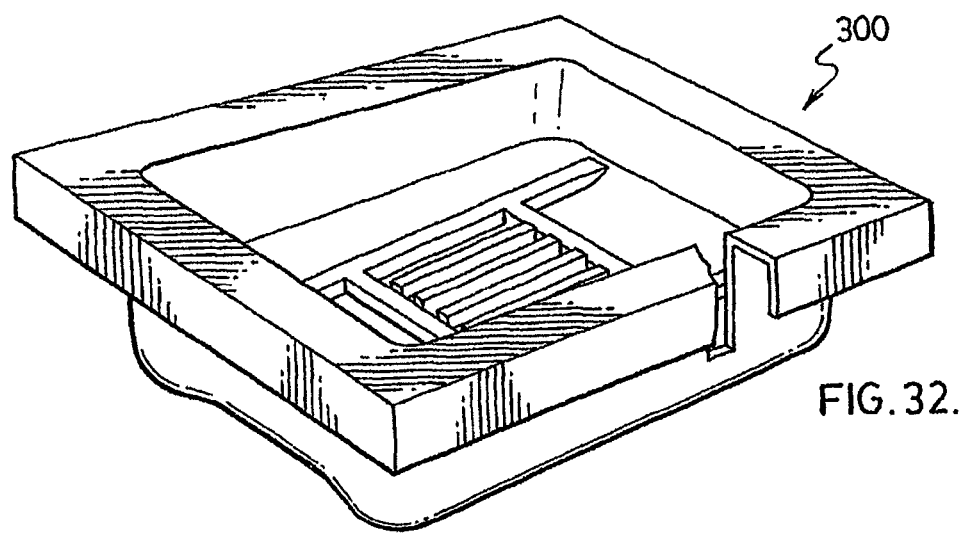

Next, the forms defined by sand-based foundry compositions 280 and 295 are recombined to define a mold cavity 297—see FIG. 30.

An aperture 293 or other port is drilled or otherwise created in the form produced by sand-based foundry composition 295 and molten aluminum 299 is dispensed therethrough using a conventional gating system to fill mold cavity 297. Molten aluminum 299 is allowed to cool after which sand-based foundry compositions 280 and 295 are broken away thereby yielding lower mold section 300—see FIGS. 31 and 32.

Figure 33:
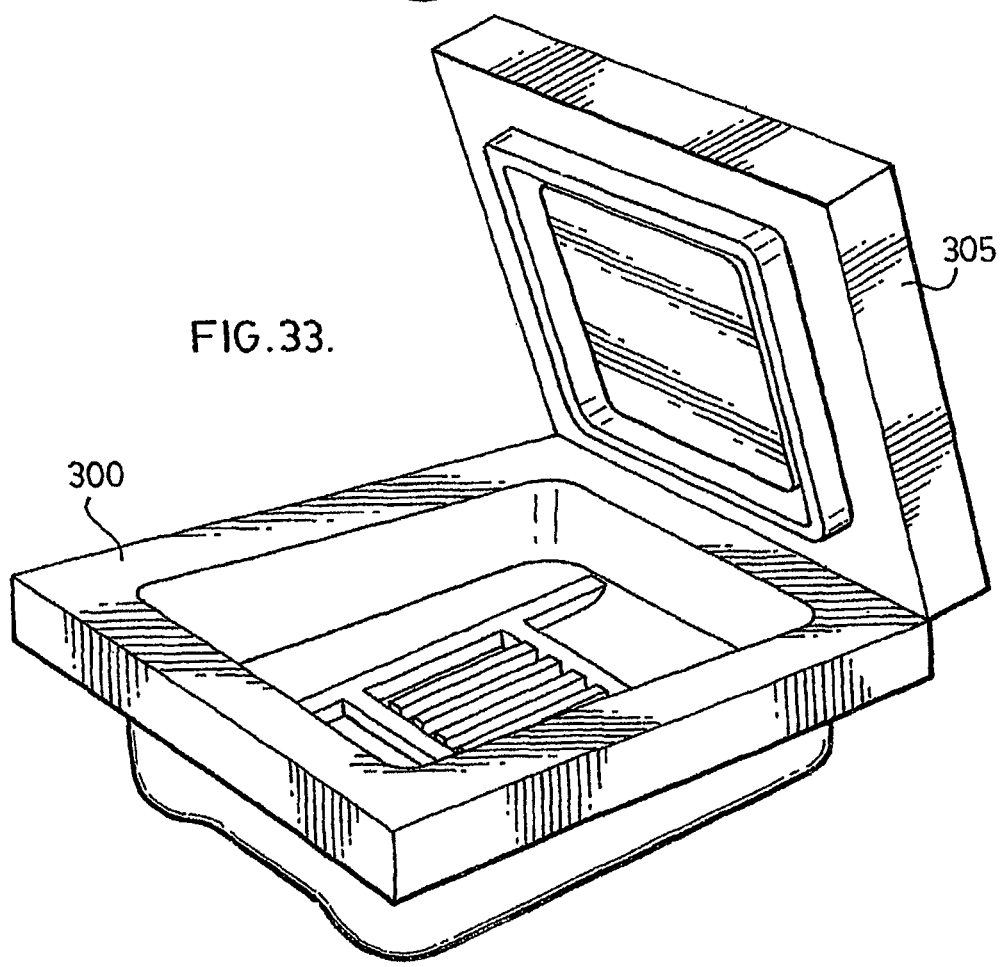
FIG. 33 illustrates a perspective view of an embodiment of the present mold.

Various of the steps shown above with reference to FIGS. 17-30 may be repeated to produce a lid portion 305 of the mold shown in FIG. 33. For example, with reference to FIG. 23, the form produced by plaster composition 270 may be used in steps such as those appearing in FIGS. 25 (excluding insert 235) and 27-30. If it is not desired to have a textured surface produced by lid portion 305 of the mold shown in FIG. 33, the use of mat 235 is not necessary in the production of lid portion 305.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. For example, in the process to produce the present mold, if the design of the seating surface element incorporating the plurality of peaks and the plurality of valleys is not highly contoured, it is possible produce a machined master form as shown in FIG. 14 without the need to carry out the steps shown in FIGS. 12 and 13. Further, its possible to use materials other than the plaster compositions and sand-based foundry composition specifically referred to with reference to FIGS. 17-30. Still further, it is possible to adopt patterns other than those shown in FIGS. 6a, 6b, 6c and 6d—e.g., a herringbone pattern, a triangular pattern, a polygonal pattern containing more than four sides and the like. It is therefore contemplated that the appended claims will cover any such modifications or embodiments. Further, all of the claims are hereby incorporated by reference into the description of the preferred embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A vehicular seat back or vehicular seat bottom comprising a single piece of molded foam consisting essentially of:
   a molded foam substrate unconnected to other foam substrates;
   and a molded seating surface element disposed between a pair of wing portions disposed on either side thereof, an outermost surface of the molded seating surface element configured for contact with an occupant of the vehicular seat back or vehicular seat bottom and comprising: (a) first portion having an exposed plurality of peak portions and a plurality of valley portions unconnected to other foam substrates, and (b) a second portion being free from of any peak portions and valley portions; and
   wherein a skin is present on the exposed plurality of peak portions and a plurality of valley portions of the outermost surface of the molded seating surface element, so that the foam has a greater density at the outermost surface as compared to the remainder of the molded seating surface element and the molded foam substrate.

2. The seat element defined in claim 1, wherein each peak comprises an apex portion.

3. The seat element defined in claim 2, wherein the apex portion comprises a first pointed portion.

4. The seat element defined in claim 2, wherein the apex portion comprises a first rounded portion.

5. The seat element defined in claim 2, wherein the apex portion comprises a first flat portion.

6. The seat element defined in claim 1, wherein plurality of peak portions comprises a first series of elongate peak portions and a second series of elongate peak portions, the first series and the second series being disposed transverse to one another.

7. The seat element defined in claim 1, wherein plurality of valley portions comprises a first series of elongate valley portions and a second series of elongate valley portions, the first series and the second series being disposed transverse to one another.

8. The seat element defined in claim 1, wherein the plurality of peak portions is comprised in a plurality of substantially upstanding projections.

9. The seat element defined in claim 8, wherein the plurality of projections comprise substantially the same shape and substantially the same height.

10. The seat element defined in claim 8, wherein the plurality of projections comprise different shapes and different heights.

11. The seat element defined in claim 8, wherein the plurality of projections comprise substantially the same shape and different height.

12. The seat element defined in claim 8, wherein the plurality of projections comprise different shapes and the same height.

13. The seat element defined in claim 1, wherein the plurality of peak portions are interconnected to one another.

14. The seat element defined in claim 1, wherein the plurality of peak portions are independent of one another.

15. A vehicular seat back or vehicular seat bottom comprising a single piece of molded foam consisting essentially of:
   a molded foam substrate unconnected to other foam substrates;
   and a molded seating surface element disposed between a pair of wing portions disposed on either side thereof, an outermost surface of the molded seating surface element configured for contact with an occupant of the vehicular seat back or vehicular seat bottom and comprising: (a) a first portion having an exposed first plurality of peak portions and a first plurality of valley portions unconnected to other foam substrates configured to define a first pattern, and (b) a second portion having an exposed second plurality of peak portions and a second plurality of valley portions unconnected to other foam substrates configured to define a second pattern; and
   wherein: (i) the first pattern and the second pattern are different, and (ii) a skin is present on the exposed first and second plurality of peak portions and first and second plurality of valley portions of the outermost surface of the molded seating surface element, so that the foam has a greater density at the outermost surface as compared to the remainder of the molded seating surface element and the molded foam substrate.

16. The seat element defined in claim 15, wherein each peak comprises an apex portion.

17. The seat element defined in claim 16, wherein the apex portion comprises a first pointed portion.

18. The seat element defined in claim 16, wherein the apex portion comprises a first rounded portion.

19. The seat element defined in claim 16, wherein the apex portion comprises a first flat portion.

20. The seat element defined in claim 15, wherein the first and second plurality of peak portions each is comprised in a plurality of substantially upstanding projections.

21. The seat element defined in claim 20, wherein the plurality of projections comprise substantially the same shape and substantially the same height.

22. The seat element defined in claim 20, wherein the plurality of projections comprise different shapes and different heights.

23. The seat element defined in claim 20, wherein the plurality of projections comprise substantially the same shape and different height.

24. The seat element defined in claim 20, wherein the plurality of projections comprise different shapes and the same height.

25. The seat element defined in claim 15, wherein the plurality of peak portions are interconnected to one another.

26. The seat element defined in claim 15, wherein the plurality of peak portions are independent of one another.

* * * * *